United States Patent
Umehara et al.

(10) Patent No.: US 9,052,457 B1
(45) Date of Patent: Jun. 9, 2015

(54) ELECTRONIC APPARATUS, ELECTRONIC DEVICE, AND LIGHT-TRANSMISSIVE COVER MEMBER

(71) Applicant: KYOCERA Corporation, Kyoto-shi, Kyoto (JP)

(72) Inventors: Motohiro Umehara, Yasu (JP); Shin Murakami, Omihachiman (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/459,920

(22) Filed: Aug. 14, 2014

(30) Foreign Application Priority Data

Dec. 21, 2013 (JP) ................................. 2013-264697

(51) Int. Cl.
*G02B 5/20* (2006.01)
*G02B 1/02* (2006.01)
*H04R 17/00* (2006.01)

(52) U.S. Cl.
CPC *G02B 5/208* (2013.01); *G02B 1/02* (2013.01); *H04R 17/005* (2013.01)

(58) Field of Classification Search
CPC ............... G04B 35/10; G04B 41/87; G04B 2235/3217; G04B 35/113; G04B 35/117; G02B 1/105; G02B 1/11; G02B 1/02; G02B 5/208; C30B 29/20; C30B 31/10; G02F 2001/133394; C03C 17/3417; H04R 2499/15; H04R 17/00; H04R 2499/11; H04R 7/045; H04R 17/005
USPC ............. 381/306, 333, 334, 151, 152, 190; 362/612, 618, 622, 627, 633, 88, 97.1, 362/97.2, 97.4; 428/1.62; 501/153; 345/173, 176, 177; 349/58
See application file for complete search history.

(56) References Cited

U.S. PATENT DOCUMENTS 3,377,176 A * 4/1968 Weaver et al. ................. 264/681
6,427,017 B1 * 7/2002 Toki .............................. 381/190

(Continued)

FOREIGN PATENT DOCUMENTS

JP H10-003267 A 1/1998
JP 2001-272513 A 10/2001

(Continued)

OTHER PUBLICATIONS

Apetz, Rolf, "Transparent Alumina: A Light-Scattering Model", Mar. 2003, Journal of the American Ceramic Society, vol. 86, Issue 3, p. 480-486.*

(Continued)

*Primary Examiner* — Vivian Chin
*Assistant Examiner* — Jason R Kurr
(74) *Attorney, Agent, or Firm* — Procopio, Cory, Hargreaves & Savitch LLP

(57) ABSTRACT

An electronic apparatus, a light-transmissive cover member, and an electronic device are disclosed. The electronic apparatus may include an image display device that includes an image display surface and a light-transmissive cover member. The light-transmissive cover member is arranged such that at least part of the light-transmissive cover member faces the image display surface. The light-transmissive cover member is a single crystal that contains alumina ($Al_2O_3$) as a main component. Due to the light-transmissive cover member, the transmittance of light having a wavelength of 260 nm is less than 92% of the transmittance of light having a wavelength of approximately 550 nm.

17 Claims, 14 Drawing Sheets

(56) References Cited

U.S. PATENT DOCUMENTS

| | | |
|---|---|---|
| 6,939,908 B1* | 9/2005 | Singhal et al. ............... 524/430 |
| 8,199,959 B2* | 6/2012 | Miyata ........................ 381/388 |
| 2010/0014034 A1 | 1/2010 | Matsuhira |
| 2012/0249281 A1 | 10/2012 | Campbell et al. |
| 2013/0236699 A1 | 9/2013 | Prest et al. |
| 2013/0328792 A1 | 12/2013 | Myers et al. |
| 2014/0023430 A1 | 1/2014 | Prest et al. |
| 2014/0030443 A1 | 1/2014 | Prest et al. |
| 2014/0087197 A1* | 3/2014 | Weber et al. ................. 428/432 |
| 2014/0133074 A1* | 5/2014 | Zahler et al. ............. 361/679.01 |
| 2014/0139978 A1* | 5/2014 | Kwong .................... 361/679.01 |
| 2014/0192467 A1* | 7/2014 | Kwong ...................... 361/679.3 |

FOREIGN PATENT DOCUMENTS

| | | |
|---|---|---|
| JP | 2002-201096 | 7/2002 |
| JP | 2004-075500 A | 3/2004 |
| JP | 2005-031297 A | 2/2005 |
| JP | 2008-111984 A | 5/2008 |
| JP | 2011-061316 | 3/2011 |
| JP | 2013-053064 A | 3/2013 |
| JP | 2013-141213 A | 7/2013 |
| WO | 2008-093704 A1 | 8/2008 |

OTHER PUBLICATIONS

International Search Report Dated Mar. 24, 2015, issued for International Application No. PCT/JP2014/083963.

* cited by examiner

ELECTRONIC APPARATUS, ELECTRONIC DEVICE, AND LIGHT-TRANSMISSIVE COVER MEMBER

CROSS-REFERENCE TO RELATED APPLICATION

The present application claims priority under 35 USC §119 to Japanese Patent Application No. 2013-264697 filed on Dec. 21, 2013, entitled "Electronic Apparatus and Light-Transmissive Cover Member", the entirety of which is incorporated herein by reference.

FIELD

The present invention relates to an electronic apparatus and a light-transmissive cover member.

BACKGROUND

Electronic apparatuses currently in use often have a plurality of functional units. These functional units may include a wireless communication unit and an image display device. In particular, portable electronic devices known as smartphones and tablets, which may include relatively larges displays as well as a touch panel for an input device, have become more widespread. However, in recent years, there is growing concern about the adverse effects these apparatuses may have on the eyes of their operators due to the light emitted from an image display surface of an image display device.

SUMMARY

An electronic device and light-transmissive cover member are presented. The electronic apparatus may include an image display device that includes an image display surface and a light-transmissive cover member. The light-transmissive cover member is arranged such that at least part of the light-transmissive cover member faces the image display surface. The light-transmissive cover member is a single crystal that contains alumina ($Al_2O_3$) as a main component. Due to the light-transmissive cover member, the transmittance of light having a wavelength of 260 nm is less than 92% of the transmittance of light having a wavelength of approximately 550 nm.

DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure are described herein in the context of one practical non-limiting application, namely, an electronic apparatus such as a mobile phone. Embodiments of the disclosure, however, are not limited to such mobile phone, and the techniques described herein may be utilized in other applications. For example, embodiments may be applicable to e-readers, digital cameras, electronic game machines, digital music players, personal digital assistants (PDA), tablets, personal handy phone system (PHS), laptop computers, TV's, Global Positioning Systems (GPS's) or navigation systems, health equipment, and other communication devices. As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

<External Appearance of Electronic Apparatus>

Figure 1A:
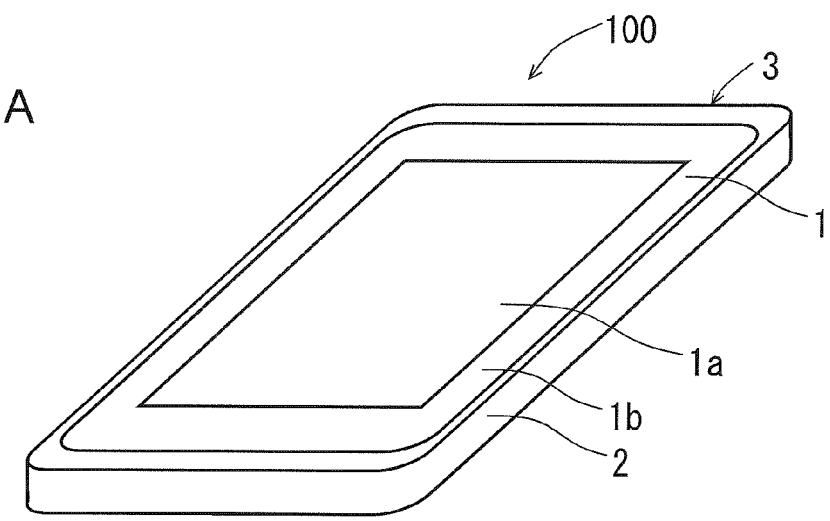
FIG. 1A is a perspective view illustrating the external appearance of an exemplary electronic apparatus.
Figure 1B:
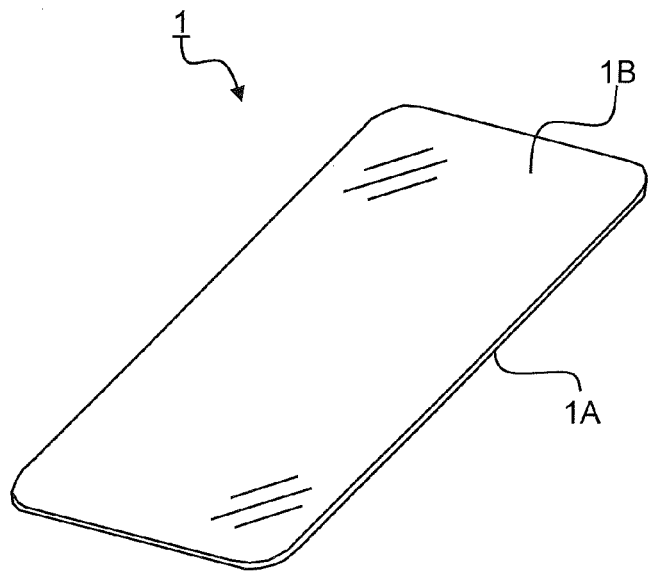
FIG. 1B is a perspective view schematically illustrating a light-transmissive cover member included in the electronic apparatus illustrated in FIG. 1A.

FIG. 1A is a perspective view schematically describing an electronic apparatus 100 as an embodiment of an electronic apparatus, and FIG. 1B is a perspective view schematically illustrating a light-transmissive cover member 1 included in the electronic apparatus illustrated in FIG. 1A.

Figure 2:
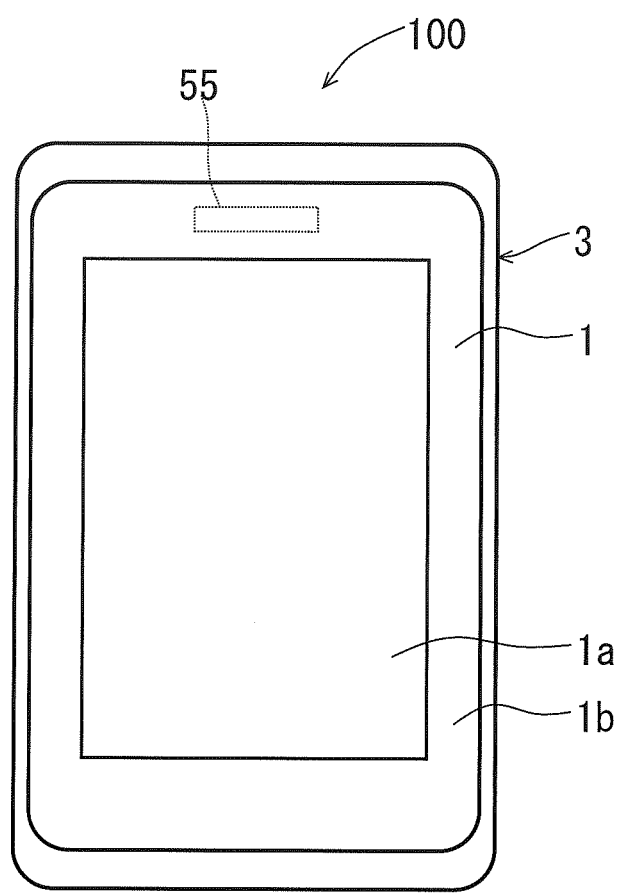
FIG. 2 is a front view illustrating the exemplary external appearance of the electronic apparatus.

FIG. 2 is a front view illustrating the electronic apparatus 100.

Figure 3:
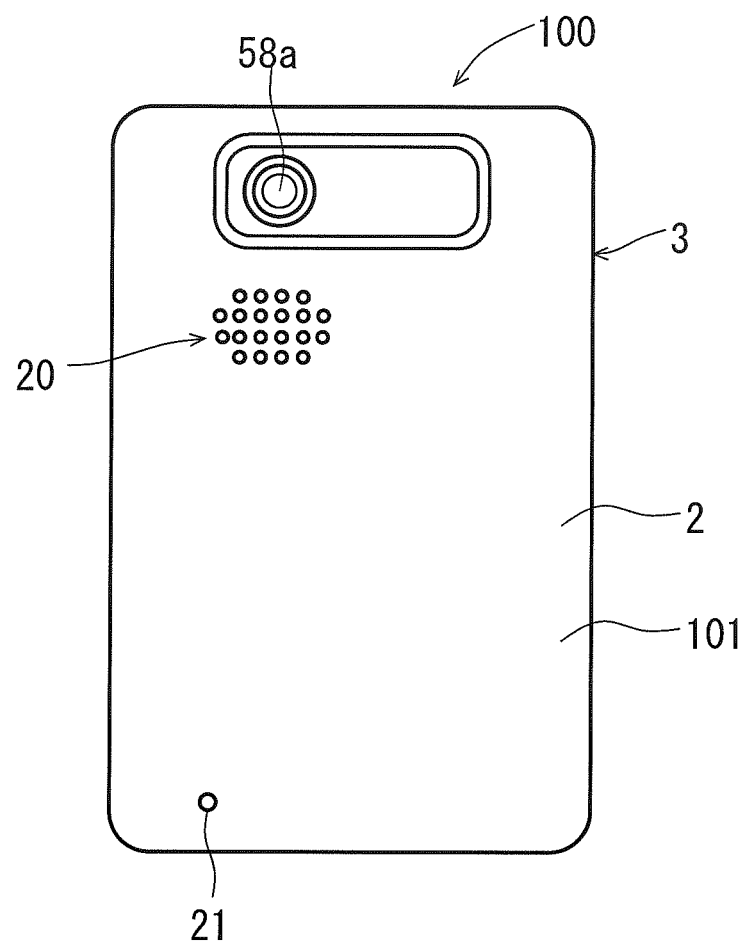
FIG. 3 is a rear view illustrating the external appearance of the exemplary electronic apparatus.

FIG. 3 is a rear view illustrating the electronic apparatus 100. For example, the electronic apparatus 100 according to the embodiment is a mobile phone.

Figure 4:
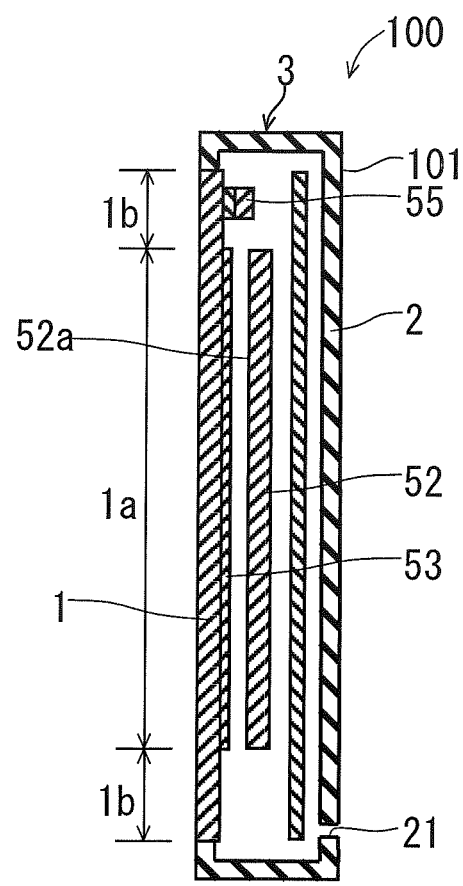
FIG. 4 is a cross-sectional view illustrating the exemplary electronic apparatus.

FIG. 4 is a cross-sectional view schematically illustrating the electronic apparatus 100.

As illustrated in FIGS. 1A to 4, the electronic apparatus 100 includes the light-transmissive cover member 1, a casing 2, and an image display device 52 that includes an image display surface 52a. The light-transmissive cover member 1 is a plate having a rectangular shape in a plan view or top view.

An apparatus case 3 is configured by combining the light-transmissive cover member 1 and the casing 2.

The light-transmissive cover member 1 is disposed such that at least part of the light-transmissive cover member 1 faces the image display surface 52a. When the image display surface 52a of the electronic apparatus 100 is planar, the light-transmissive cover member 1 may be a plate-like member including a planar first surface 1A which faces the image display surface 52a. Further, the light-transmissive cover member 1 may be a plate-like member including a second surface 1B parallel to the first surface 1A.

The light-transmissive cover member 1 is a single crystal with alumina ($Al_2O_3$) as a main component. In the embodiment, the meaning of "main component" or "mainly" is that the component is contained by the amount of at least 50% by mass and preferably 70% by mass. The single crystal with alumina ($Al_2O_3$) as a main component is generally known as sapphire. It is difficult to damage or break sapphire. Furthermore, sapphire has high thermal conductivity and high heat dissipation when compared to strengthened glass and other similar materials.

The conventional single crystal of alumina ($Al_2O_3$) has high purity and few lattice defects, such as oxygen defects. The conventional single crystal of alumina ($Al_2O_3$) is colorless and transparent. The transmittance of light through the conventional single crystal of alumina ($Al_2O_3$) varies with wavelength. For example, the transmittance of light having a wavelength of approximately 260 nm is approximately 94% of the transmittance of light having a wavelength of approximately 550 nm.

In contrast, in the light-transmissive cover member 1 of the embodiment, the transmittance of light having a wavelength of approximately 260 nm is less than 92% of the transmittance of light having a wavelength of approximately 550 nm. That is, the light-transmissive cover member 1 has a relatively suppressed transmittance of light having a wavelength corresponding to that of ultraviolet light. In terms of suppressing the transmittance of light having a wavelength corresponding to that of ultraviolet light, in the light-transmissive cover member 1, it is preferable that the transmittance of light having a wavelength of 260 nm is less than 72% of the transmittance of light having a wavelength of approximately 550 nm. It is more preferable that the transmittance of light having a wavelength of 260 nm is less than 50% of the transmittance of light having a wavelength of approximately 550 nm.

In addition, in the conventional single crystal of alumina ($Al_2O_3$), the average value of the transmittance of light having a wavelength range of approximately 230 nm to 300 nm is approximately 92% to 100% of the average value of the transmittance of light having a wavelength range of approximately 500 nm to 800 nm. In contrast, in the light-transmissive cover member 1, the average value of a transmittance of light having a wavelength range of approximately 230 nm to 300 nm is less than 92% of an average value of a transmittance of light having a wavelength range of approximately 500 nm to 800 nm. That is, in the light-transmissive cover member 1, the transmittance of light having a wavelength range corresponding to that of ultraviolet light is suppressed when compared to the transmittance of light through the conventional single crystal of alumina ($Al_2O_3$). When white light is transmitted through the light-transmissive cover member 1, the color of the light transmitted through the light-transmissive cover member 1 may be more purplish red than the color of light which is incident to the light-transmissive cover member 1.

In terms of suppressing the transmittance of light having a wavelength corresponding to that of ultraviolet light more, in the light-transmissive cover member 1, the average value of the transmittance of light having a wavelength range of approximately 230 nm to 300 nm is preferably less than 85% of an average value of a transmittance of light having a wavelength range of approximately 500 nm to 800 nm. The average value of the transmittance of light having a wavelength range of 230 nm to 300 nm is an arithmetic mean value of the transmittance of each wavelength measured at 2 nm intervals in the wavelength range of 230 nm to 300 nm. The transmittance of light can be measured using a spectrophotometer such as the UV-3100PC manufactured by Shimadzu Corporation.

The light-transmissive cover member 1 includes a display portion 1a on which various pieces of information such as characters, symbols, and figures are displayed. The display portion 1a may have a rectangular shape in a plan view or top view. A peripheral edge region 1b which surrounds the display portion 1a in the light-transmissive cover member 1 may be black or dark due to a film or the like being attached thereto. The peripheral edge 1b is a non-display portion on which the information is not displayed. A touch panel 53 is attached to an inner surface of the light-transmissive cover member 1. A user can issue various instructions with respect to the electronic apparatus 100 by operating the display portion 1a of the light-transmissive cover member 1 with a finger or the like.

The casing 2 constitutes the peripheral edge region of the front surface, the side surface, and the rear surface of the electronic apparatus 100. The casing 2 may be made of a polycarbonate resin or of any other material so long as the material is a member which covers the electronic apparatus. For example, a material which is the same as that of the light-transmissive cover member 1 may be used for the casing 2.

The image display device 52 is included in the inside of the electronic apparatus 100 as described above. The image display device 52 is controlled by the control unit 50 described below and displays image information indicating characters, symbols, and figures on the image display surface 52a.

The image display device 52 is a so-called liquid crystal display panel. It has a backlight unit and a liquid crystal layer. The backlight unit may include an LED lamp. The LED lamp may emit white light, and it may include a luminescent material and a blue LED element. The white light emitted from the LED lamp is partially colored by being transmitted through the liquid crystal layer included in the image display device 52 so that the image information displayed on the image display surface 52a of the image display device 52 is formed. While the white light emitted from the LED lamp is transmitted through the liquid crystal layer, the color of the transmitted light is changed by limiting the wavelength range of the light being transmitted for each part of the liquid crystal layer. Thus the image information indicating characters, symbols, and figures having various colors and shapes is formed on the image display surface 52a. The light indicating the image information formed on the image display surface 52a in this manner is incident to the first surface 1A of the light-transmissive cover member 1, emits from the second surface 1B, and enters eyes of a user of the electronic apparatus 100. The user recognizes the characters, symbols, and figures indicated by the image information.

Figure 5:
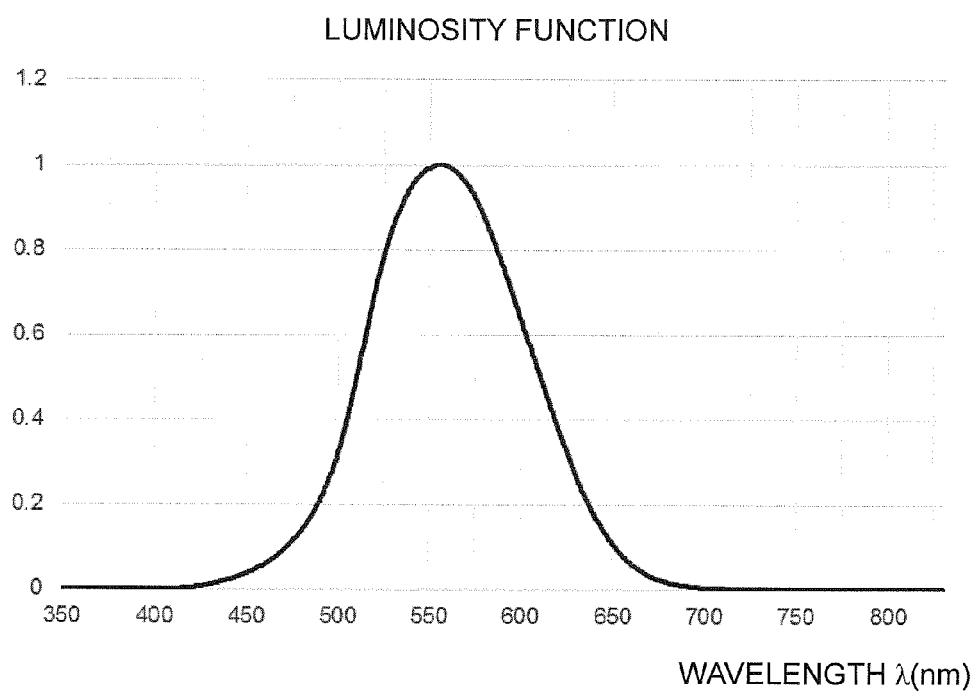
FIG. 5 is a graph of luminosity function.

FIG. 5 is a graph illustrating a luminosity function in which intensity of brightness felt by eyes of a human for each wavelength of light is represented by a numerical value. More specifically, the graph illustrated in FIG. 5 represents a CIE (International Commission on Illumination) luminosity function. As illustrated in the graph of the luminosity function of FIG. 5, most people perceive that light having a wavelength of 550 nm as the brightest and all other colors are not as bright. The light having a wavelength of approximately 550 nm is substantially green light. Light having a wavelength of 260 nm is ultraviolet light and is not perceptible to humans. A wavelength range of approximately 500 nm to 800 nm is corresponding to the color range from green to red. A wavelength range of approximately 230 nm to 300 nm is corresponding to ultraviolet light.

Since light having a wavelength range of approximately 230 nm to 300 nm is not visible, people tend to continuously watch image display device 52 unconsciously having high light intensity for a long time unaware of the exposure to UV light, and thus the light damages the eyes of a human unknowingly because the energy is relatively high.

In the light-transmissive cover member 1, the transmittance of light having a wavelength range with a low luminosity function and high energy is set to be less than the transmittance of light having a wavelength range with a high luminosity function and low energy.

In the electronic apparatus 100 including the light-transmissive cover member 1, the above-described image display device 52 is a so-called liquid crystal display panel. The white light from the backlight may contain a relatively large amount of light having a wavelength range of approximately 230 nm to 300 nm, which is light that has relatively high energy. The light-transmissive cover member 1 may more easily absorb light having a wavelength range with relatively high energy.

Various images such as operation screens, game images, photos, or moving images are displayed on the image display device 52, and the user who operates the electronic apparatus 100 tends to watch the image display device 52 for a long time. For example, since light having a wavelength 300 nm or lower with relatively high energy is not visible, the operator may continuously watch the image display device 52 unconsciously for a long time unaware of the exposure to UV light. The light-transmissive cover member 1 suppresses the amount of light, which is easily incident to eyes of the operator in a large amount, having a wavelength range corresponding to that of ultraviolet light so that adverse effects on eyes of the operator can be suppressed.

<First Aspect of Light-Transmissive Cover Member>

A light-transmissive cover member of a first aspect contains cobalt (Co), nickel (Ni), sodium (Na), titanium (Ti), chromium (Cr), iron (Fe), and copper (Cu) in a total amount of $3\times10^{-4}$% by mass or more. Further, one or more elements among Co, Ni, Na, Ti, Cr, Fe, and Cu may not be contained in the light-transmissive cover member. In addition, it is preferable that the light-transmissive cover member contain Ti, Fe, and Cu in a total amount of $3\times10^{-4}$% by mass or more. Similarly, one or more elements among Ti, Fe, and Cu may not be contained in the light-transmissive cover member. Each of Co, Ni, Ti, Cr, Fe, and Cu are transition metals, and Na is an alkali metal. Sapphire is colored when a small amount of any thereof is contained in the sapphire. The color and the concentration thereof, that is, an absorption spectrum of transmitted light by sapphire is changed due to a combination of the transition metals or alkali metals contained in sapphire, and the balance among content ratios of the respective transition metals and alkali metals. In the case where Co, Ni, Na, Ti, Cr, Fe, and Cu are contained in a total amount of $3\times10^{-4}$% by mass or more, for example, absorption of light having a wavelength of 300 nm or less becomes higher. Among the metal elements, the degree of coloration of sapphire is higher when Ti, Fe, or Cu is present. In order to increase absorption of light having a wavelength of 300 nm or less, it is preferable that Ti, Fe, and Cu be contained in a total amount of $3\times10^{-4}$% by mass or more.

The content ratios of the metal elements in the light-transmissive cover member 1 can be measured using a glow discharge mass spectrometer. For example, as a measuring device, a double-convergence type GDMS device (VG9000, VG Elemental Inc.) is used for measuring a sample in which sapphire is powered under the conditions of a discharge power of 1.0 kV and 2.5 mA, a resolution of 4000, and an auxiliary electrode of Ga (6N: 30 mmφ to 1 mmt).

When the light-transmissive cover member 1 of the first aspect is used, ultraviolet light incident to eyes of the operator can be effectively suppressed while the light transmitting member 1 is transparent to the degree that the operator does not consider the image information displayed on the image display surface 52a to be exceedingly red. As an example, the light-transmissive cover member of the first aspect may contain the following amounts:

approximately $0.5\times10^{-6}$% by mass to $1.5\times10^{-6}$% by mass of Co, approximately $0.5\times10^{-5}$% by mass to $1.5\times10^{-5}$% by mass of Ni, approximately $0.5\times10^{-5}$% by mass to $1.5\times10^{-5}$% by mass of Na, approximately $0.5\times10^{-4}$% by mass to $1.5\times10^{-4}$% by mass of Ti, approximately $1.5\times10^{-5}$% by mass to $2.5\times10^{-5}$% by mass of Cr, approximately $1.5\times10^{-4}$% by mass to $2.5\times10^{-4}$% by mass of Fe, and approximately $0.5\times10^{-4}$% by mass to $1.5\times10^{-4}$% by mass of Cu.

Figure 6:
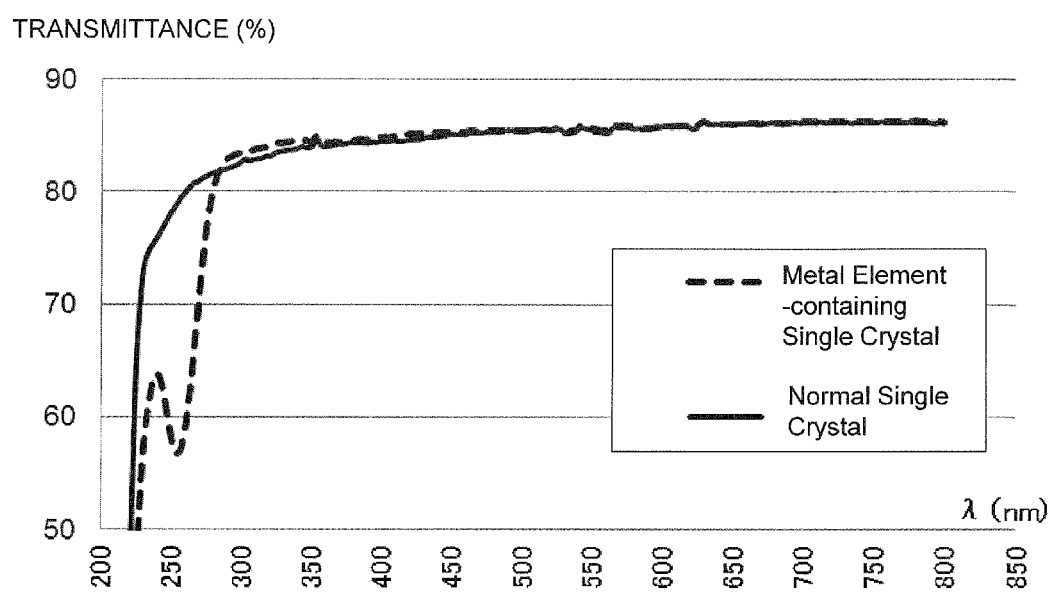
FIG. 6 is a graph illustrating an example of spectral transmittance of one version of the light-transmissive cover member.

The graph of FIG. 6 illustrates the spectrum transmittance of a metal element-containing single crystal containing Co, Ni, Na, Ti, Cr, Fe, and Cu in a total amount of $3\times10^{-4}$% by mass or more and an example of a conventional (or normal) single crystal containing Co, Ni, Na, Ti, Cr, Fe, and Cu in a total amount of less than $3\times10^{-4}$% by mass under the same conditions. More specifically, the metal element-containing single crystal of the graph illustrated in FIG. 6 contains Ti, Fe, and Cu in a total amount of $3\times10^{-4}$% by mass or more. For example, the metal element-containing single crystal contains, for example, approximately $1\times10^{-6}$% by mass of Co, approximately $1\times10^{-5}$% by mass of Ni, approximately $1\times10^{-5}$% by mass of Na, approximately $1\times10^{-4}$% by mass of Ti, approximately $2\times10^{-5}$% by mass of Cr, approximately $2\times10^{-4}$% by mass of Fe, and approximately $8\times10^{-5}$% by mass of Cu.

FIG. 6 is a graph of respective examples obtained by measuring single crystals respectively having a thickness of 4.3 mm. The spectrum transmittance illustrated in FIG. 6 is data obtained by measuring the transmittance of light respectively having a wavelength of 2 nm using a spectrophotometer such as the UV-3100PC manufactured by Shimadzu Corporation.

As is evident from the graph in FIG. 6, while a conventional single crystal has a wide wavelength range and substantially uniform transmittance, the light-transmissive cover member 1 comprised of the metal element-containing single crystal has a low transmittance in the wavelength range of ultraviolet light. That is, while the light from the image display device 52 is transmitted through the light-transmissive cover member 1 of the first aspect, the light-transmissive cover member 1 absorbs a relatively large amount of light in the range containing ultraviolet light having a relatively high energy.

In the example of FIG. 6, in the normal single crystal, the transmittance of light having a wavelength of approximately 260 nm is approximately 94% of the transmittance of light having a wavelength of approximately 550 nm. In contrast, in the metal element-containing single crystal body, the transmittance of light having a wavelength of approximately 260 nm is approximately 69% of the transmittance of light having a wavelength of approximately 550, which is a smaller value.

In addition, in the example of FIG. 6, in the normal single crystal, the average value of a transmittance of light having a wavelength range of approximately 230 nm to 300 nm is 79% while the average value of a transmittance of light having a wavelength range of approximately 500 nm to 800 nm is 86%. Thus the average value of a transmittance of light having a wavelength range of approximately 230 nm to 300 nm is approximately 93% of the average value of a transmittance of light having a wavelength range of approximately 500 nm to 800 nm, which is a comparatively large value. In contrast, in the metal element-containing single crystal, the average value of a transmittance of light having a wavelength range of approximately 230 nm to 300 nm is 70% while the average value of a transmittance of light having a wavelength range of approximately 500 nm to 800 nm is approximately 86%. Thus the average value of a transmittance of light having a wavelength range of approximately 230 nm to 300 nm is approximately 81% of an average value of a transmittance of light having a wavelength range of approximately 500 nm to 800 nm, which is a comparatively small value. In the case of using the light-transmissive cover member 1 of the first aspect, which contains transition elements in a greater amount than conventional sapphire, ultraviolet light incident to eyes of the operator can be effectively suppressed while the image information displayed on the image display surface 52a is transparent to the degree that the operator does not consider the image information to be exceedingly red.

<Second Aspect of Light-Transmissive Cover Member>

A light-transmissive cover member 1 of a second aspect contains Cr. Cr is one of the transition metals, but Cr can strongly color sapphire red even when Cr is contained in sapphire even in small amounts. More specifically, the light-transmissive cover member 1 of the second aspect is a single crystal body containing alumina ($Al_2O_3$) as a main component and contains, for example, $1 \times 10^{-5}$% by mass or more of Cr. The transmitted light of a crystal body allowing the single crystal containing alumina ($Al_2O_3$) to contain a small amount of Cr is purplish red. When the light-transmissive cover member 1 contains Cr, $1 \times 10^{-5}$% by mass or more of Cr is necessary to be contained in the light-transmissive cover member 1. The content ratio of Cr in the light-transmissive cover member 1 can be measured using, for example, the above-described double-convergence type GDMS device (VG9000, VG Elemental Inc.) under conditions the same as the conditions described above.

Similarly, in the case of using the light-transmissive cover member 1 of the second aspect, ultraviolet light incident to eyes of the operator can be effectively suppressed while the light transmitting member 1 is transparent to the degree that the operator does not consider the image information displayed on the image display surface 52a to be exceedingly red.

Figure 7:
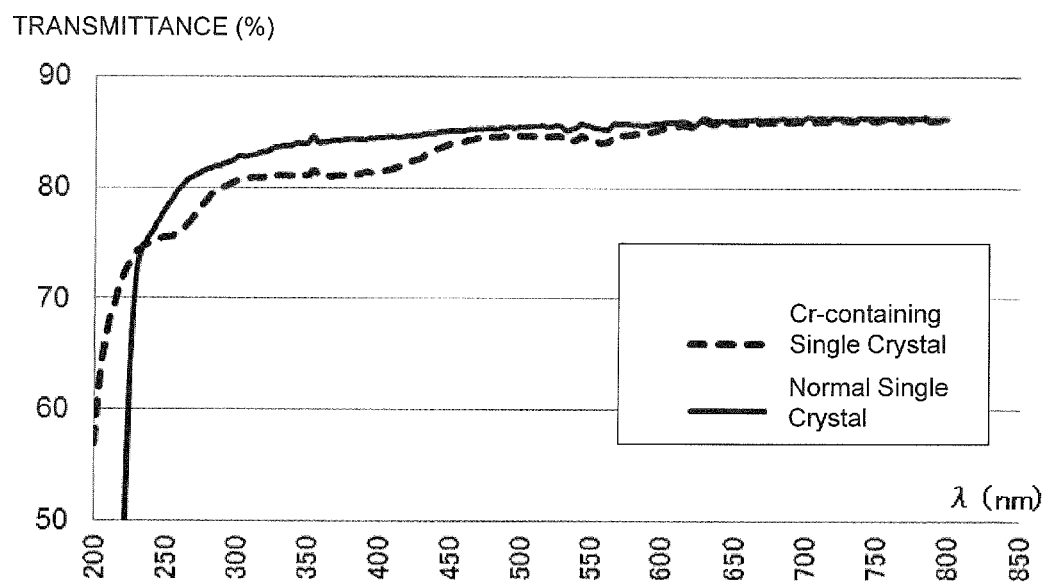
FIG. 7 is a graph illustrating an example of spectral transmittance of another version of the light-transmissive cover member.

FIG. 7 is a graph illustrating the wavelength dispersion of the spectral transmittance when white light is radiated on the Cr-containing single crystal and then transmitted therethrough. FIG. 7 also illustrates a graph indicating wavelength dispersion values of the spectrum transmittance under the same conditions as in the single crystal of alumina ($Al_2O_3$) containing no Cr (hereinafter referred to as the normal or conventional single crystal). The thickness of the normal single crystal illustrated in FIG. 7 is the same as that of the light-transmissive cover member 1, which is 4.3 mm. The spectrum transmittance illustrated in FIG. 7 is data obtained by measuring transmittance using a UV-3100PC (manufactured by Shimadzu Corporation). The Cr-containing single crystal of the graph in FIG. 7 is a single crystal containing approximately $4 \times 10^{-4}$% by mass of Cr.

In the example of FIG. 7, for example, in the Cr-containing single crystal body of the embodiment, the transmittance of light having a wavelength of approximately 260 nm is approximately 90% of the transmittance of light having a wavelength of approximately 550, which is a small value. In addition, the average value of a transmittance of light having a wavelength range of approximately 230 nm to 300 nm is approximately 77% while the average value of a transmittance of light having a wavelength range of approximately 500 nm to 800 nm is approximately 86%. Thus, the average value of a transmittance of light having a wavelength range of approximately 230 nm to 300 nm is approximately 90% of an average value of a transmittance of light having a wavelength range of approximately 500 nm to 800 nm, which is a comparatively small value.

As is evident from the graph in FIG. 7, while a conventional single crystal has a wide wavelength range and substantially uniform transmittance, the light-transmissive cover member 1 comprised of the Cr-containing single crystal has a low transmittance in the wavelength range shorter than approximately 550 nm. The wavelength range shorter than approximately 550 nm includes both a wavelength range of ultraviolet light and a wavelength range of high energy visible (HEV) light.

In the transparent crystal body containing a single crystal of alumina ($Al_2O_3$) as a main component, redness of light to be transmitted increases as the content ratio of Cr increases. Additionally the redness also increases as the thickness increases. In terms of being transparent to the degree that the operator does not consider the image information to be exceedingly red, it is preferable that the light-transmissive cover member 1 formed of a transparent crystal body contains a single crystal of alumina ($Al_2O_3$) as a main component contain $5 \times 10^{-4}$% by mass or more of Cr and the thickness in a direction perpendicular to the first surface is less than 1 mm.

<Third Aspect of Light-Transmissive Cover Member>

A light-transmissive cover member 1 of a third aspect contains alumina ($Al_2O_3$) whose content ratio of oxygen is smaller than that of the ideal chemical equivalent as a main component. The ideal chemical formula of the single crystal of alumina is $Al_2O_3$. The chemical formula of the single crystal of the third aspect is represented by $Al_2O_3$, and the content ratio of oxygen is smaller than that of the ideal chemical equivalent. The oxygen-deficient single crystal can be grown by adjusting conditions of the atmosphere and the like at the time of growth of the single crystal. The oxygen-deficient single crystal whose content ratio of oxygen is smaller than the ideal chemical equivalent has an energy level which may largely absorb the light having a wavelength range of approximately 230 nm to 300 nm.

Specifically, in an oxygen-deficient single crystal body, the transmittance of light having a wavelength of approximately 260 nm is less than approximately 85% of the transmittance of light having a wavelength of approximately 550 nm. In addition, the average value of the transmittance of light having a wavelength range of approximately 230 nm to 300 nm is less than 90% of the average value of the transmittance of light having a wavelength range of approximately 500 nm to 800 nm. In the case of using the light-transmissive cover member 1 comprised of the oxygen-deficient single crystal, light having relatively high energy incident to eyes of the operator can be effectively suppressed while the light transmitting member 1 remains transparent to the degree that the operator does not consider the image information displayed on the image display surface 52a to be exceedingly red.

The image display device 52 was previously described as being a so-called liquid crystal display panel including the LED lamp as the backlight unit. However, the image display device is not limited to that particular configuration. For example, a liquid crystal display device including a so-called fluorescent lamp as a backlight unit and other kinds of image display devices such as a so-called organic electroluminescent (EL) device and the like may be used. Since the light emitted from other image display devices contains so-called high energy visible light having a wavelength of approximately 380 nm to 400 nm which is close to violet in color, the light-transmissive cover member 1 suppresses the amount of light having a wavelength range corresponding to that of high energy visible light incident to the eyes of the operator so that adverse effects on eyes of the operator are suppressed in this case.

As illustrated in FIG. 3, a speaker hole 20 and a microphone hole 21 are formed on a rear surface 101 of the electronic apparatus 100, that is, the rear surface of the apparatus case 3. Further, an imaging lens 58a including an imaging unit 58 described below is exposed from the rear surface 101 of the electronic apparatus 100.

Figure 8:
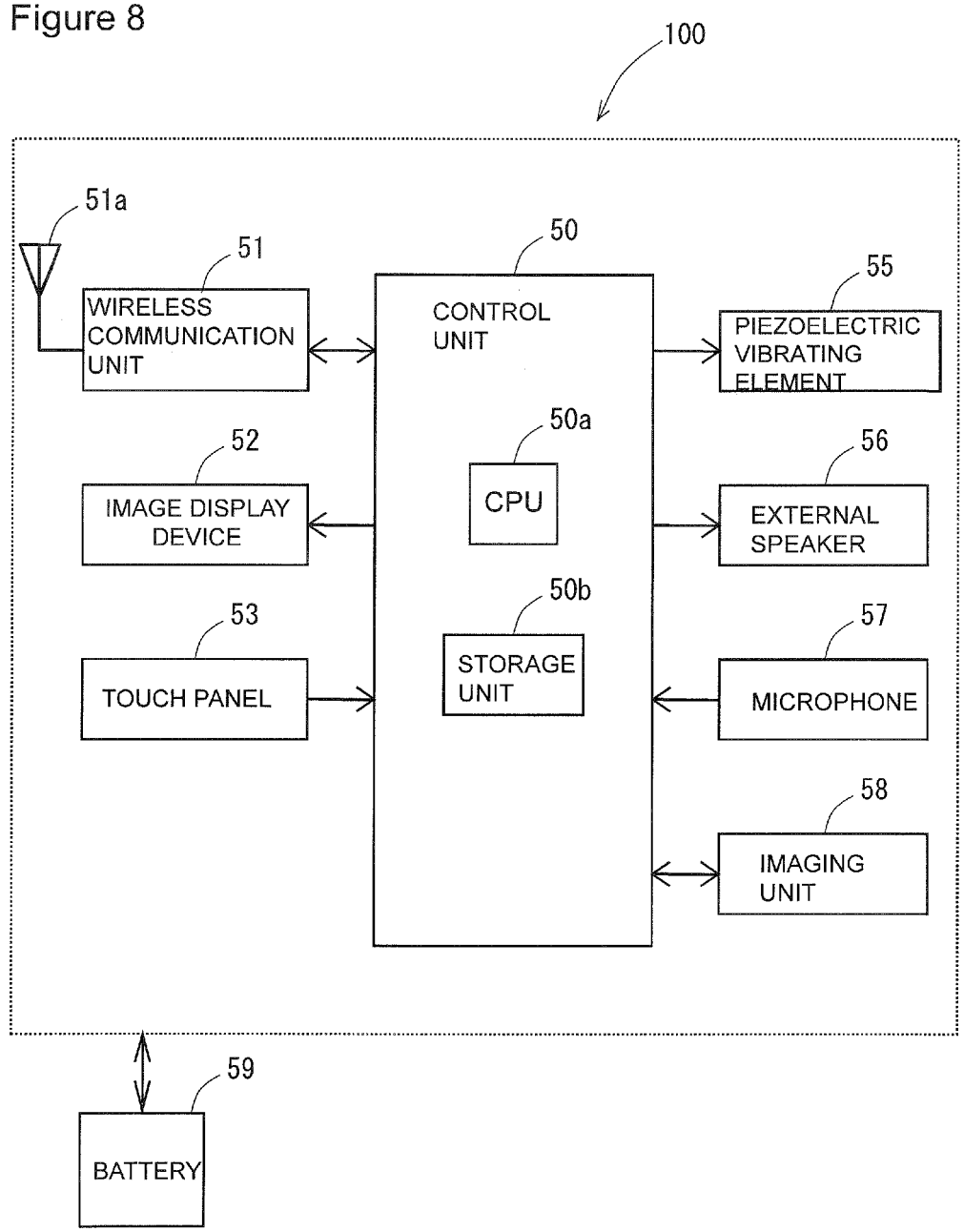
FIG. 8 is a block diagram illustrating an electrical configuration of the exemplary electronic apparatus.

Electrical configuration of electronic apparatus FIG. 8 is a block diagram illustrating an electrical configuration of an electronic apparatus 100. As illustrated in FIG. 8, the electronic apparatus 100 includes the control unit 50, a wireless communication unit 51, the image display device 52, the touch panel 53, a piezoelectric vibrating element 55, an external speaker 56, a microphone 57, an imaging unit 58, and a battery 59, and these constituent elements are arranged in the apparatus case 3.

The control unit 50 includes a CPU 50a and a storage unit 50b and manages overall operations of the electronic apparatus 100 by controlling other configuration elements of the electronic apparatus 100. The storage unit 50b is configured of a ROM and a RAM. Various functional blocks are formed in the control unit 50 by the CPU 50a executing various programs in the storage unit 50b.

The wireless communication unit 51 receives a signal from a communication device such as a web server connected to the Internet or a mobile phone and separate from the electronic apparatus 100 using an antenna 51a via a base station. The wireless communication unit 51 performs an amplification process and down conversion on the received signal and outputs the signal to the control unit 50. The control unit 50 performs demodulation processing or the like on the input received signal and acquires a sound signal indicating a voice or music included in the received signal. Further, the wireless communication unit 51 performs up-converting and the amplification process on a transmission signal including a sound signal or the like generated in the control unit 50, and transmits the transmission signal after the process from the antenna 51a in a wireless manner. The transmission signal from the antenna 51a is received in a communication device connected to the Internet or a mobile phone and separate from the electronic apparatus 100 via the base station.

The image display device 52 may be a liquid crystal image display device as described above and displays various pieces of information such as characters, signals, and figures on the image display surface 52a by being controlled by the control unit 50. The information displayed on the image display device 52 can be recognized by the user of the electronic apparatus 100 by being displayed on the display portion 1a of the light-transmissive cover member 1.

The touch panel 53 may be a projection type electrostatic capacitance touch panel and detects an operation of the user with respect to the display portion 1a of the light-transmissive cover member 1. The touch panel 53 is attached to the inner surface of the light-transmissive cover member 1 and includes two sheet-like electrode sensors which are disposed so as to face each other. Two electrode sensors are bonded to each other using a transparent adhesive sheet.

A plurality of long and narrow X electrodes which respectively extend along an X-axis direction (for example, a lateral direction of the electronic apparatus 100) and are disposed in parallel with each other are formed in one electrode sensor. A plurality of long and narrow Y electrodes which respectively extend along a Y-axis direction (for example, a vertical direction of the electronic apparatus 100) and are disposed in parallel with each other are formed in another electrode sensor. When a finger of the user is touches the display portion 1a of the light-transmissive cover member 1, the electrostatic capacitance between an X electrode and a Y electrode positioned below the touched portion is changed so that the operation on the display portion 1a of the light-transmissive cover member 1 in the touch panel 53 is detected. The change in the electrostatic capacitance between the X electrode and the Y electrode, which is generated in the touch panel 53, is transmitted to the control unit 50, and the control unit 50 specifies the content of the operation performed on another surface 1B of the light-transmissive cover member 1 based on the change in the electrostatic capacitance and performs an operation according to the specified contents.

The piezoelectric vibrating element 55 is an element for transmitting a reception sound to the user of the electronic apparatus 100. The piezoelectric vibrating element 55 is vibrated by a driving voltage applied from the control unit 50. The control unit 50 generates a driving voltage based on a sound signal indicating the reception sound and applies the driving voltage to the piezoelectric vibrating element 55. The piezoelectric vibrating element 55 is vibrated by the control unit 50 based on the sound signal indicating the reception sound and thus the reception sound is transmitted to the user of the electronic apparatus 100. In this manner, the control unit 50 functions as a driving unit allowing the piezoelectric vibrating element 55 to vibrate based on the sound signal. The piezoelectric vibrating element 55 will be described below in detail.

The external speaker 56 outputs a sound by converting the electronic sound signal from the control unit 50 into the sound. The sound output from the external speaker 56 is output to the outside from speaker holes 20 provided on the rear surface 101 of the electronic apparatus 100.

The microphone 57 outputs an electrical sound signal to the control unit 50 by converting the sound input from the outside of the electronic apparatus 100 into the electrical sound signal. The sound from the outside of the electronic apparatus 100 is incorporated in the electronic apparatus 100 from microphone holes 21 provided on the rear surface 101 of the electronic apparatus 100 and is input to the microphone 57.

The imaging unit 58 includes the imaging lens 58a, an imaging element, and the like, and images a still image and a moving image based on the control by the control unit 50.

The battery 59 outputs power of the electronic apparatus 100. The power output from the battery 59 is supplied with respect to the respective electronic components contained in the control unit 50 or the wireless communication unit 51 included in the electronic apparatus 100.

<Details of Piezoelectric Vibrating Element>

Figure 9:
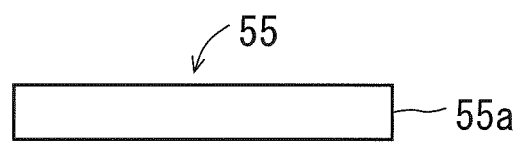
FIG. 9 is a plan view illustrating a piezoelectric vibrating element.
Figure 10:
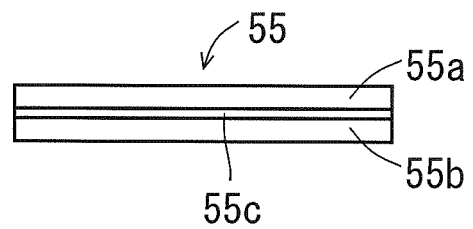
FIG. 10 is a side view illustrating the piezoelectric vibrating element.

FIGS. 9 and 10 are respectively a top view and a side view illustrating a structure of the piezoelectric vibrating element 55. As illustrated in FIGS. 9 and 10, the piezoelectric vibrating element 55 has a long shape in one direction. Specifically, the piezoelectric vibrating element 55 has a long and narrow rectangular plate shape in a plan view. The piezoelectric vibrating element 55 has, for example, a bimorph structure and includes a first piezoelectric ceramic plate 55a and a second piezoelectric ceramic plate 55b which are attached to each other through a shim material 55c.

Figure 11:
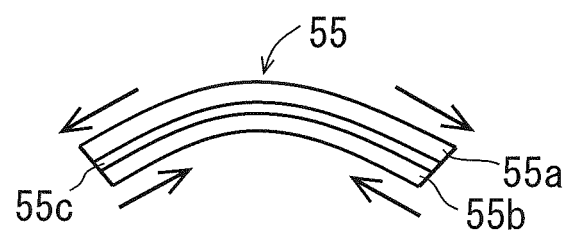
FIG. 11 is a view illustrating the piezoelectric vibrating element in a state of being curved.

As illustrated in FIG. 11, in the piezoelectric vibrating element 55, when a positive voltage is applied to the first piezoelectric ceramic plate 55a and a negative voltage is applied to the second piezoelectric ceramic plate 55b, the first piezoelectric ceramic plate 55a extends along the longitudinal direction and the second piezoelectric ceramic plate 55b contracts along the longitudinal direction. Accordingly, as illustrated in FIG. 11, the piezoelectric vibrating element 55 is bent into a convex shape with the first piezoelectric ceramic plate 55a being outside.

Figure 12:
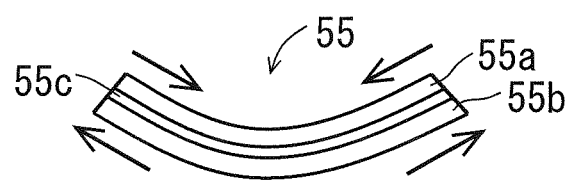
FIG. 12 is a view illustrating the piezoelectric vibrating element in a state of being curved.

As illustrated in FIG. 12, in the piezoelectric vibrating element 55, when a negative voltage is applied to the first piezoelectric ceramic plate 55a and a positive voltage is applied to the second piezoelectric ceramic plate 55b, the first piezoelectric ceramic plate 55a contracts along the longitudinal direction and the second piezoelectric ceramic plate 55b extends along the longitudinal direction. Accordingly, as illustrated in FIG. 12, the piezoelectric vibrating element 55 is bent into a convex shape with the second piezoelectric ceramic plate 55b being outside.

The piezoelectric vibrating element 55 vibrates while being bent by alternatively taking the state of FIG. 11 and the state of FIG. 12. The control unit 50 allows the piezoelectric vibrating element 55 to vibrate while being bent by applying an AC voltage in which the positive voltage and the negative voltage alternatively appear at an area between the first piezoelectric ceramic plate 55a and the second piezoelectric ceramic plate 55b.

FIGS. 10 to 12 illustrates one structure made of the first piezoelectric ceramic plate 55a and the second piezoelectric ceramic plate 55b which are bonded to each other by interposing the shim material 55c therebetween in the piezoelectric vibrating element 55. However, a plurality of the structures may be laminated to each other.

<Arrangement Position of Piezoelectric Vibrating Element>

Figure 13:
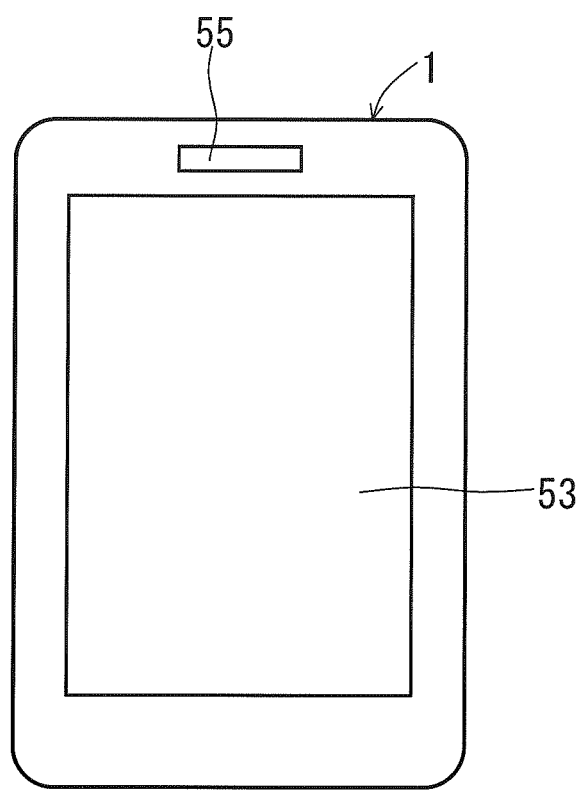
FIG. 13 is a plan view illustrating a light-transmissive cover member.

FIG. 13 is a plan view when the light-transmissive cover member 1 is seen from the first surface 1A side. The piezoelectric vibrating element 55 is attached to the first surface 1A of the light-transmissive cover member 1 using an adhesive such as a double-sided tape. The piezoelectric vibrating element 55 is arranged in a position which is not overlapped with the image display device 52 and the touch panel 53 when the piezoelectric vibrating element 55 is seen from side of the first surface 1A of the light-transmissive cover member 1 in a plan view.

<Regarding Generation of Reception Sound Due to Vibration of Piezoelectric Vibrating Element>

In the present embodiment, an air conduction sound and a conduction sound are transmitted to the user from the light-transmissive cover member 1 via the vibration of the piezoelectric vibrating element 55. That is, the vibration of the piezoelectric vibrating element 55 is transmitted to the light-transmissive cover member 1 so that the air conduction sound and the conduction sound are transmitted to the user from the light-transmissive cover member 1.

Here, the term "air conduction sound" means a sound recognized in a human brain by the vibration of an eardrum due to a sound wave which enters an external auditory meatus hole (also known as an "ear hole"). On the other hand, the term "conduction sound" is a sound recognized in a human brain by the vibration of the eardrum due to the vibration of an auricle transmitted to the eardrum. Hereinafter, the air conduction sound and the conduction sound will be described in detail.

Figure 14:
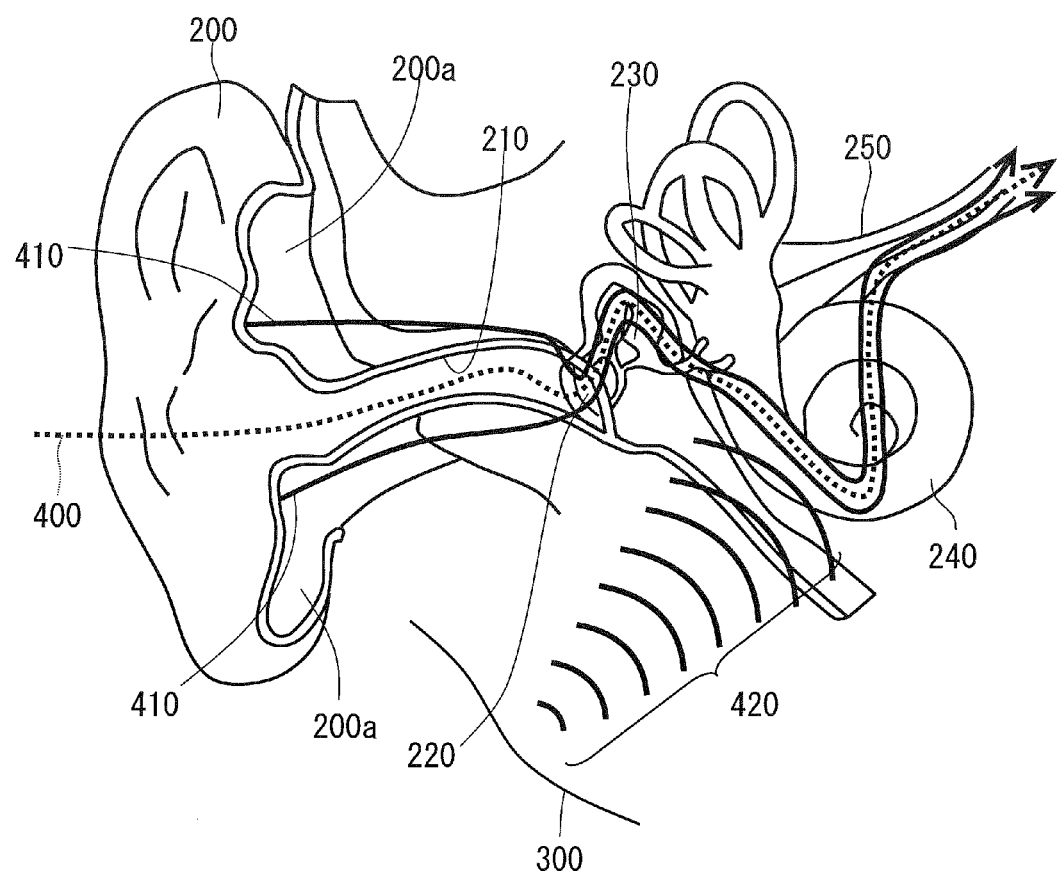
FIG. 14 is a view describing an air conduction sound and a conduction sound.

FIG. 14 is a view for describing the air conduction sound and the conduction sound. FIG. 14 illustrates a structure of an ear of the user of the electronic apparatus 100. In FIG. 14, a wavy line 400 indicates a conduction path of a sound signal of the air conduction sound. A solid line 410 indicates the conduction path of the sound signal of the conduction sound.

When the piezoelectric vibrating element 55 mounted to the light-transmissive cover member 1 vibrates based on the electric sound signal indicating the reception sound, the light-transmissive cover member 1 vibrates and a sound wave is output from the light-transmissive cover member 1. When the user moves the light-transmissive cover member 1 of the electronic apparatus 100 close to an auricle 200 of the user by holding the electronic apparatus 100 in a hand or the light-transmissive cover member 1 of the electronic apparatus 100 is put to the auricle 200 of the user, the sound wave output from the light-transmissive cover member 1 enters an external auditory meatus hole 210. The sound wave from the light-transmissive cover member 1 enters in the external auditory meatus hole 210 and the eardrum 220 vibrates. The vibration of the eardrum 220 is transmitted to au auditory ossicle 230 and the auditory ossicle 230 vibrates. In addition, the vibration of the auditory ossicle 230 is transmitted to a cochlea 240 and is converted into an electrical signal in the cochlea 240. The electrical signal is transmitted to the brain by passing through an acoustic nerve 250 and the reception sound is recognized in the brain. In this manner, the air conduction sound is transmitted from the light-transmissive cover member 1 to the user.

When the user puts the light-transmissive cover member 1 of the electronic apparatus 100 to the auricle 200 of the user by holding the electronic apparatus 100 in a hand, the auricle 200 is vibrated by the light-transmissive cover member 1 which is vibrated by the piezoelectric vibrating element 55. The vibration of the auricle 200 is transmitted to the eardrum 220, and thus the eardrum 220 vibrates. The vibration of the eardrum 220 is transmitted to the auditory ossicle 230, and thus the auditory ossicle 230 vibrates. The vibration of the auditory ossicle 230 is transmitted to the cochlea 240 and is converted into an electrical signal in the cochlea 240. The electrical signal is transmitted to the brain by passing through the acoustic nerve 250 and the reception sound is recognized in the brain. In this manner, the conduction sound is transmitted from the light-transmissive cover member 1 to the user. FIG. 14 illustrates an auricular cartilage 200a in the inside of the auricle 200.

In addition, the conduction sound herein is different from a bone conduction sound. The bone conduction sound is a sound recognized in a human brain by the vibration of the skull and direct stimulation of the inner ear such as the cochlea caused by the vibration of the skull. In FIG. 14, in a case of vibrating the jawbone 300, the transmission path of the sound signal while the bone conduction sound is recognized in the brain is indicated with a plurality of arcs 420.

In this manner, in the electronic apparatus 100 according to the present embodiment, the air conduction sound and the conduction sound can be transmitted from the light-transmissive cover member 1 to the user of the electronic apparatus 100 due to the vibration of the light-transmissive cover member 1 through the vibration of the piezoelectric vibrating element 55. Since the user can hear a sound when the user puts the light-transmissive cover member 1 to the auricle 200 of the user, the communication using a telephone can be performed without concerning the position of the electronic apparatus 100 put against an ear so much. In addition, the user can hear the conduction sound due to the vibration of the auricle, the electronic apparatus 100 makes it easy for the user to hear the sound even when there is a large amount of the ambient noise. Accordingly, the user can appropriately perform communication using a telephone even when there is a large amount of the ambient noise.

In addition, even in a state in which earplugs or earphones are fixed to the ears of the user, the reception sound from the electronic apparatus 100 can be recognized by putting the light-transmissive cover member 1 to the auricle. Further, even in the state in which headphones are fixed to the ears of the user, the reception sound from the electronic apparatus 100 can be recognized by putting the light-transmissive cover member 1 to the headphones.

<Regarding Holes of Ear Piece (Holes for Receiver)>

In the electronic apparatus 100 according to the present embodiment, since the reception sound is generated by the vibration of the light-transmissive cover member 1, the reception sound can be appropriately transmitted to the user even through there are no holes in the ear piece of the light transmissive cover member 1. Therefore, production costs can be reduced because the laser processing cost associated with making such holes is no longer needed. Further, since the light-transmissive cover member 1 has no holes in the ear piece, the strength of the light-transmissive cover member 1 is higher than it would be if the light-transmissive cover member 1 had holes in the ear piece. Furthermore, in the present embodiment, since there are no holes of the ear piece on the surface of the electronic apparatus 100, the problem of water or dust entering the holes of the ear piece is eliminated. Therefore, the necessity for a water-proof structure or a dust-proof structure along with the cost of such structures is reduced.

In the above-described embodiment, a case of a mobile phone to which the present invention is applied is described. However, the present invention can be applied to an electronic apparatus other than the mobile phone. For example, embodiments may be applicable to tablet terminal, e-readers, digital cameras, video game consoles, digital music players, personal digital assistants (PDA), personal handy phone system (PHS), laptop computers, portable TV's, Global Positioning Systems (GPS's) or navigation systems, machining tools, pedometers, health equipment such as weight scales, display monitors, smartwatches, and the like. In addition, the present invention is not limited to the above-described embodiments, and various modifications and changes may be made in the range not departing from the scope of the present invention.

What is claimed is:

1. An electronic apparatus, comprising:
    an image display surface; and
    a cover member, comprising a single crystal sapphire body mainly containing alumina (Al2O3), arranged to at least partially face the image display surface, the cover member being light-transmissive, wherein the cover member further comprises at least one element selected from a group consisting of Co, Ni, Na, Ti, Cr, Fe, and Cu in a total amount of $3\times10^{-4}$% by mass or more, causing a first transmittance of light having a wavelength of 260 nm to be less than 92% of a second transmittance of light having a wavelength of 550 nm.

2. The electronic apparatus according to claim 1, wherein the first transmittance is less than 72% of the second transmittance.

3. The electronic apparatus according to claim 1, wherein the first transmittance is less than 50% of the second transmittance.

4. The electronic apparatus according to claim 1, wherein the cover member has a first average value of transmittances of lights having wavelengths between 230 nm and 300 nm is less than 92% of a second average value of transmittances of lights having wavelengths between 500 nm and 800 nm.

5. The electronic apparatus according to claim 4, wherein the first average value is less than 85% of the second average value.

6. The electronic apparatus according to claim 1, wherein the cover member contains Cr.

7. The electronic apparatus according to claim 6, wherein the amount of Cr is $5\times10^{-5}$% by mass or more, and a thickness of the cover member in a direction perpendicular to a principal surface is smaller than 1 mm.

8. The electronic apparatus according to claim 1, wherein the image display surface is planar, and the cover member is a plate that includes a planar surface facing the image display surface.

9. The electronic apparatus according to claim 1, wherein the cover member is a plate having a rectangular shape in a plan view.

10. The electronic apparatus according to claim 1, wherein the image display device is a liquid crystal display panel or an organic EL device.

11. The electronic apparatus according to claim 1, further comprising:
    a piezoelectric vibrating element arranged on the cover member that vibrates by a driving voltage based on a sound signal.

12. The electronic apparatus according to claim 11, wherein the piezoelectric vibrating element vibrates for transmitting a conduction sound based on the sound signal.

13. The electronic apparatus according to claim 11, wherein the piezoelectric vibrating element has a long and narrow rectangular plate shape.

14. The electronic apparatus according to claim 11, further comprising:
    wherein the piezoelectric vibrating element is arranged in a position which is not overlapped with the image display device.

15. An electronic device, comprising:
    an image display device comprising an image display surface; and
    a light-transmissive single crystal sapphire cover member mainly containing alumina (Al2O3), at least partially covering the image display surface, wherein the cover member further comprises at least one element selected from a group consisting of Co, Ni, Na, Ti, Cr, Fe, and Cu in a total amount of $3\times10^{-4}$% by mass or more, that causes first and second transmittances of light having a wavelength of 260 nm and 550 nm respectively, wherein the first transmittance is less than 85% of the second transmittance.

16. An electronic apparatus, comprising:
    an image display device comprising an image display surface; and
    a cover member, comprising a single crystal sapphire body mainly containing alumina (Al2O3), whose content ratio of oxygen is smaller than the ideal chemical equivalent, arranged to at least partially face the image display surface, the cover member being light-transmissive, wherein the content ratio of oxygen causes a first transmittance of light having a wavelength of 260 nm to be less than 92% of a second transmittance of light having a wavelength of 550 nm.

17. An electronic apparatus, comprising:
an image display device comprising an image display surface; and
a light-transmissive single-crystal sapphire cover member mainly containing alumina (Al2O3), whose content ratio of oxygen is smaller than the ideal chemical equivalent, at least partially covering the image display surface, wherein the content ratio of oxygen causes first and second transmittances of light having a wavelength of 260 nm and 550 nm respectively, wherein the first transmittance is less than 85% of the second transmittance.

* * * * *